United States Patent
Srinivasan

(10) Patent No.: US 11,898,876 B2
(45) Date of Patent: Feb. 13, 2024

(54) DEVICE FOR DETERMINING ORIENTATION OF AN OBJECT

(71) Applicant: Tilak Srinivasan, Bangalore (IN)

(72) Inventor: Tilak Srinivasan, Bangalore (IN)

(*) Notice: Subject to any disclaimer, the term of this patent is extended or adjusted under 35 U.S.C. 154(b) by 539 days.

(21) Appl. No.: 17/048,623

(22) PCT Filed: Apr. 15, 2019

(86) PCT No.: PCT/IB2019/053082
§ 371 (c)(1),
(2) Date: Oct. 19, 2020

(87) PCT Pub. No.: WO2019/202468
PCT Pub. Date: Oct. 24, 2019

(65) Prior Publication Data
US 2021/0116240 A1    Apr. 22, 2021

(30) Foreign Application Priority Data
Apr. 20, 2018    (IN) .............................. 201841013751

(51) Int. Cl.
*G01C 9/10* (2006.01)
*G01C 9/06* (2006.01)

(52) U.S. Cl.
CPC ................ *G01C 9/10* (2013.01); *G01C 9/06* (2013.01); *G01C 2009/066* (2013.01); *G01C 2009/107* (2013.01)

(58) Field of Classification Search
CPC ...... G01C 9/10; G01C 9/06; G01C 2009/066; G01C 2009/107
See application file for complete search history.

(56) References Cited

U.S. PATENT DOCUMENTS

| 4,603,484 A | * | 8/1986 | Strothmann | ............. | G01C 9/06 |
| | | | | | 33/366.22 |
| 5,365,671 A | * | 11/1994 | Yaniger | .................... | G01C 9/14 |
| | | | | | 33/366.23 |

(Continued)

FOREIGN PATENT DOCUMENTS

EP    2213978 A2    8/2010

OTHER PUBLICATIONS

DE-19723069-C1: Glehr "Inclination Angle or Tilt Sensor Esp. for Use in Vehicles for E.g. Alarm Systems", Oct. 1998 (Year: 1998).*

(Continued)

*Primary Examiner* — John Fitzgerald
*Assistant Examiner* — Tania Courson
(74) *Attorney, Agent, or Firm* — Trupti Joshi

(57) ABSTRACT

The present disclosure discloses a device for determining orientation of an object. The device comprises a hollow spherical member. A plurality of sensors are positioned within a cavity defined by an inner surface and an outer surface of the hollow spherical member. Further, the device comprises a light source fixed within the hollow spherical member, and a solid sphere provided within the hollow spherical member. The solid spherical member is configured to displace within the hollow spherical member, pointing towards gravity and occupies lowermost position of the hollow spherical member, and thus blocks impingement of light on to corresponding one or more sensors at the lowermost position of the hollow spherical member. The blocked one or more sensors activate or deactivate, and generate a signal, which is received by a computing unit, to determine orientation of the object.

10 Claims, 3 Drawing Sheets

(56) References Cited

U.S. PATENT DOCUMENTS

| | | | | |
|---|---|---|---|---|
| 5,644,078 | A * | 7/1997 | Ahdoot | G01C 19/00 |
| | | | | 73/178 R |
| 5,794,355 | A * | 8/1998 | Nickum | G06F 3/0346 |
| | | | | 33/366.16 |
| 6,301,795 | B1 * | 10/2001 | Kang | G01C 9/06 |
| | | | | 33/366.11 |
| 6,543,147 | B2 * | 4/2003 | Akieda | G01C 9/12 |
| | | | | 340/440 |
| 6,690,457 | B2 * | 2/2004 | Yamaguchi | G01C 9/06 |
| 8,026,473 | B2 * | 9/2011 | Tanuma | G01D 5/342 |
| | | | | 356/139.1 |
| 8,089,621 | B2 * | 1/2012 | Horio | G01C 9/10 |
| | | | | 356/139 |
| RE45,824 | E * | 12/2015 | French | G09F 19/02 |
| 9,664,512 | B2 | 5/2017 | Srinivasan | |
| 11,287,243 | B2 * | 3/2022 | Srinivasan | G01B 11/14 |
| 2002/0071114 | A1 | 6/2002 | Yamaguchi | |
| 2002/0073564 | A1 * | 6/2002 | Akieda | G01C 9/06 |
| | | | | 33/366.24 |
| 2022/0003547 | A1 * | 1/2022 | Srinivasan | G01C 9/00 |
| 2022/0003548 | A1 * | 1/2022 | Srinivasan | G01C 9/36 |

OTHER PUBLICATIONS

JP-2002181535-A: Akieda "Inclination Sensor", Jun. 2002. (Year: 2002).*

EP-312095-A: Drumm, "Hand Held Computer Input Device With Orientation Sensor Has Rotating Sensor Which Changes Refraction Angle of Light Beam and Causes Phototransistor to Sense Varying Light Intensities", Apr. 1989. (Year: 1989).*

International Search Report dated Aug. 8, 2019, in the PCT Application No. PCT/IB2019/053082.

Written Opinion dated Aug. 8, 2019, in the PCT Application No. PCT/IB2019/053082.

* cited by examiner

DEVICE FOR DETERMINING ORIENTATION OF AN OBJECT

CROSS-REFERENCE TO RELATED APPLICATIONS

The present application is a § 371 National Phase entry of International Application No. PCT/IB2019/053082, filed Apr. 15, 2019, which claims priority to Indian Patent Application No. 201841013751, filed Apr. 20, 2018.

TECHNICAL FIELD

Present disclosure relates in general to a device for determining orientation of an object. Particularly, but not exclusively the present disclosure relates to a Ball Based Orientation Indication Device (BBOID) for determining the orientation of the object about pitch, roll and yaw axes of the object.

BACKGROUND OF THE DISCLOSURE

Determining orientation of an object may be useful in numerous applications. One such example is an airborne object such as an airplane or a helicopter, where the orientation of the airborne object is used to aid in determining orientation of the object and as well as aid in navigation of the object from its current location to a desired location. Generally, in order to describe a particular orientation or position of a rigid object in a 3-dimensional medium, three parameters along the X-axis, Y-axis and Z-axis are considered.

Conventionally, Euler angles are used to represent both the position and orientation of the rigid body. A local co-ordinate system having the following axes denoted by x, y and z which constitute the axes of frame and another co-ordinate system X, Y and Z which constitute the axes of the rotated frame. By using these co-ordinates both position and orientation of the rigid body can be determined, wherein, the reference orientation can be imagined to be a first orientation from which the frame virtually rotates to reach its actual orientation.

Myriad of devices such as gyroscopes, gimbal etc., are used in moving vehicles and aircrafts to determine the pitch, roll and yaw axes which play a key role in determining the orientation and positioning the moving vehicle/aircraft. A gyroscope works on the principle of angular momentum which basically is the amount of rotation an object has, taking into account its mass and shape. In simple words it is the vector quantity that represents the product of a body's rotational inertia and rotational velocity about a particular axis. However, the gyroscopes and gimbals may include multiple moving parts, which require frequent calibration for exhibiting accurate values. Also, the existing systems or arrangements may include more number of parts, which makes the system bulky and involves complex operational features.

The present disclosure is directed to overcome one or more limitations stated above or any other limitation associated with the prior arts.

SUMMARY

One or more shortcomings of the prior art are overcome by the system as disclosed and additional advantages are provided through the system as described in the present disclosure.

Additional features and advantages are realized through the technique of the present disclosure. Other embodiments and aspects of the disclosure are described in detail herein and are considered a part of the claimed disclosure.

In one non-limiting embodiment of the present disclosure, a device for determining orientation of an object is disclosed. The device comprises a hollow spherical member and a plurality of sensors, which are positioned at predetermined locations on the hollow spherical member. Further, the device comprises a light source, suspended within the hollow spherical member. The light source is configured to illuminate the hollow spherical member, and impingement of light on to each of the plurality of sensors. Furthermore, the device comprises a solid sphere, which is provided within the hollow spherical member. The solid sphere is configured to displace within the hollow spherical member pointing towards gravity, over one or more sensors of the plurality of sensors, to block impingement of light on corresponding one or more sensors, for determining orientation of the object.

In an embodiment, the hollow spherical member comprises an inner surface and an outer surface defining a cavity, and the plurality of sensors are positioned within the cavity.

In an embodiment, the light source is fixed to the inner surface of the hollow spherical member via one of a rod member, a holder member and a post member.

In an embodiment, each of the plurality of sensors are associated with a computing unit.

In an embodiment, blocking impingement of light on one or more sensors, activate or deactivate the corresponding one or more sensors, to generate an input signal.

In an embodiment, the computing unit indicates the orientation of the object in at least one of analog form and digital form.

In an embodiment, the input signal from the blocked one or more sensor of the plurality of sensors is received by the computing unit, to determine orientation of the object, based on the input signal.

In an embodiment, the device is configured to determine the orientation of the object in pitch, yaw and roll axes.

In an embodiment, the inner surface of the hollow spherical member made of a transparent material to allow impinging light on to each of the plurality of sensors.

In an embodiment, the solid sphere is made of an opaque material to block impinging light on to the one or more sensors of the plurality of sensors.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the detailed disclosure. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which.

Figure 1:
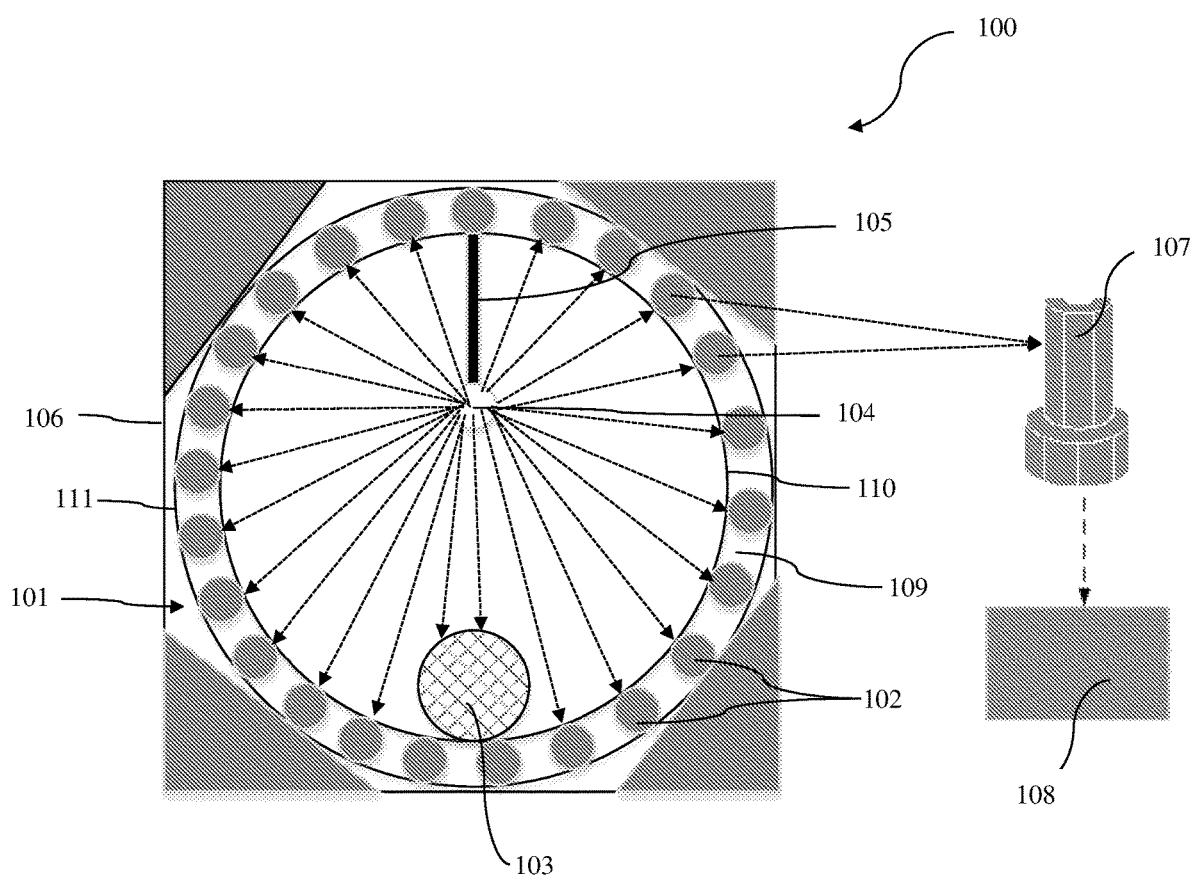
FIG. 1 illustrates sectional view of a Ball Based Orientation Indication Device (BBOID), in accordance with an exemplary-embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE DISCLOSURE

The foregoing has broadly outlined the features and technical advantages of the present disclosure in order that the description of the disclosure that follows may be better understood. Additional features and advantages of the disclosure will be described hereinafter which form the subject of the disclosure. It should be appreciated by those skilled in the art that the conception and specific embodiment disclosed may be readily utilized as a basis for modifying or designing other devices for carrying out the same purposes of the present disclosure. It should also be realized by those skilled in the art that such equivalent constructions do not depart from the spirit and scope of the disclosure. The novel features which are believed to be characteristic of the disclosure, as to its organization, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a system that comprises a list of acts does not include only those acts but may include other acts not expressly listed or inherent to such method. In other words, one or more acts in a method proceeded by "comprises . . . a" does not, without more constraints, preclude the existence of other acts or additional acts in the method.

Embodiments of the present disclosure discloses a device for determining orientation of an object. The device may be a Ball Based Orientation indication device (BBIOD) (hereinafter referred as device). The device may be accommodated within a rigid housing, which may facilitate in positioning the device on an object. In an embodiment, the device may comprise a hollow spherical member, which may be defined with a cavity between an inner and outer surface of the hollow spherical member. A plurality of sensors may be positioned at predetermined locations in the hollow spherical member i.e. in the cavity of the hollow spherical member. Further, the device may comprise a light source, fixed within the hollow spherical member. The light source may facilitate in illuminating the hollow spherical member and impinge light onto each of the plurality of sensors. Furthermore, the device comprises a solid sphere, which may be provided within the hollow spherical member. The solid sphere, may be configured to displace within the hollow spherical member, pointing towards gravity i.e. the solid sphere may occupy lowermost position of the hollow spherical member, for different orientation of the object. The solid sphere blocks impingement of light onto the corresponding one or more sensors, which are at a lowermost position of the hollow spherical member, based on orientation of the object. The one or more sensors which are blocked by the solid sphere, may generate a signal. The generated signal from the one or more sensors, may be received by a computing unit. The computing unit analyses the various signals received, computes and indicates orientation of the object in pitch, roll and yaw axes.

In the following detailed description, embodiments of the disclosure are explained with reference to accompanying figures that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1, illustrates a front view of the Ball Based Orientation Indication device (100) (BBOID) (100). The device (100) may include a hollow spherical member (101). The hollow spherical member (101) may include an inner surface (110) and an outer surface (111). In an embodiment, a cavity (109) or a gap may be defined between the inner surface (110) and the outer surface (111) of the hollow spherical member (101). A plurality of sensors (102) may be positioned at predetermined locations on the hollow spherical member (101). In an embodiment, the plurality of sensors (102) may be positioned within the cavity (109) or a gap defined between the inner surface (110) and the outer surface (111) of the hollow spherical member (101). Further, the device (100) may comprise a light source (104). The light source (104) may be fixed within the hollow spherical member (101). As an example, the light source (104) may be fixed to the inner surface (110) of the hollow spherical member (101) via a connecting means such as but not limiting to a rod member (105), a holder member, a post member (105) and the like. The light source (104) may be configured to illuminate the hollow spherical member (101) and impinge light on to each of the plurality of sensors (102). In an embodiment, the inner surface (110) of the hollow spherical member (101) may be made of a transparent material, to allow impingement of light on to each of the plurality of sensors (102) positioned within the cavity (109)

defined between the inner and outer surface (111) of the hollow spherical member (101).

In an embodiment, each of the plurality of sensors (102) may be associated with a computing unit (107). The computing unit (107) may be associated with an indication unit (108) such as a display to indicate orientation of the object in pitch, yaw and roll axes. The indication unit (108) indicates orientation of the object in at least one of analog form or digital form Further referring to FIG. 1, the device (100) may include a solid sphere (103). The solid sphere (103) may be provided within the hollow spherical member (101). The solid sphere (103) may be configured to displace i.e. roll freely within the hollow spherical member (101), upon orientation or displacement of the object. In an embodiment, the solid sphere (103) displaces within the hollow spherical member (101) pointing towards gravity i.e. the solid sphere (103) occupies substantially lower most position of the hollow spherical member (101). In an embodiment, the lowermost position of the hollow spherical member (101) varies based on the orientation of the object. The solid sphere (103) may roll over one or more sensors of the plurality of sensors (102) and blocks the corresponding one or more sensors from impinging light from the light source (104), which are at the lowermost position of the hollow spherical member (101), at that instant of time and based on the orientation of the object. The one or more sensors, which are blocked from impinging light, may activate or deactivate, based on the configuration of the sensors (102). This activation or deactivation of the one or more sensors may generate a signal. This signal from the one or more sensors may be received by a computing unit (107). The computing unit (107), may be programmed to indicate orientation of the object in pitch, roll and yaw axes, based on the input signal received from the one or more sensors. Further, the computing unit (107) indicates orientation of the object in at least one of an analog form and a digital form.

In an embodiment, the solid sphere (103) may be made of an opaque material, to completely block impingement of light on to the one or more sensors, for effective functioning of the device (100).

In an embodiment, the housing (106) may facilitate in fastening or positioning the device (100) on an object, whose orientation has to be determined. As an example, the housing (106) may assist in fastening the device (100) on to the object via fastening means, such as but not limiting to screw fastening, bolting arrangement and the like.

Figure 2:
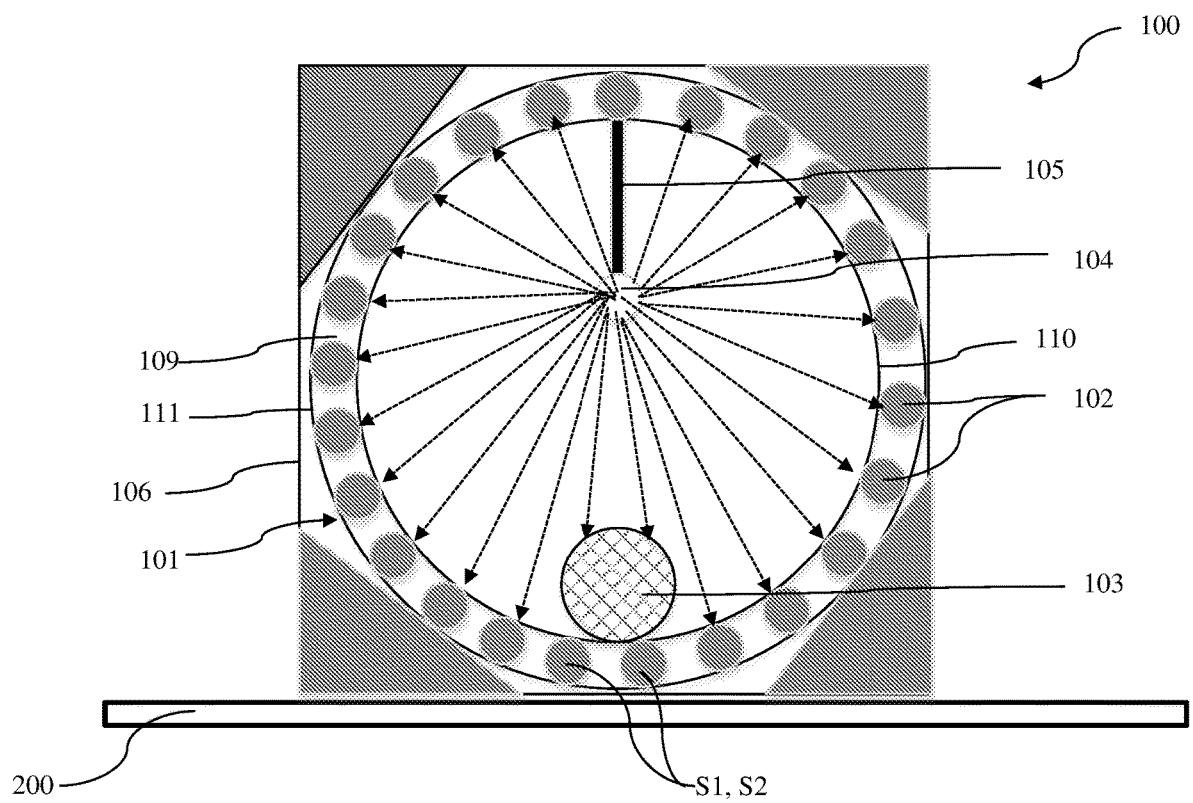
FIG. 2 illustrates the Ball Based Orientation Indication Device (BBOID) of FIG. 1, positioned on an object, which is in an idle condition in accordance to an exemplary embodiment of the present disclosure.

Now referring to FIG. 2 which, illustrates the device (100) fixed to the object. As an example, the object may be a platform (200). The platform (200) may be in an idle condition i.e. the orientation or displacement of the platform (200) is zero. The solid sphere (103) may displace within the hollow spherical member (101), pointing towards gravity and may occupy a lowermost position of the hollow spherical member (101), under the action of gravity. The solid sphere (103) in the lower most position, may cover the one or more sensors of the plurality of sensors (102) and thus, blocks the impingement of light on to the corresponding one or more sensors. As an example, the solid sphere (103) may block sensors S1 and S2, which are at the lowermost position of the hollow spherical member (101). In an embodiment, lowermost position of the hollow spherical member (101) may continuously vary based on the orientation of the object. The one or more sensors S1 and S2 covered by the solid sphere (103) may activate or deactivate, based on the configuration of the sensors (102). In an embodiment, the activated or deactivated one or more sensors S1 and S2 may generate a signal. The signal from the blocked one or more sensors S1 and S2 may be received by the computing unit (107). In an embodiment, the signal generated from the one or more sensor S1, S2 (i.e. the sensor deficient of imping light), corresponds to the orientation of the object about its orientation axis. Based on the signal from the one or more sensors S and S2, the computing unit (107) may indicate orientation of the object, in pitch, roll and yaw axes (i.e. three mutually perpendicular axes), in digital or analog from.

Figure 3:
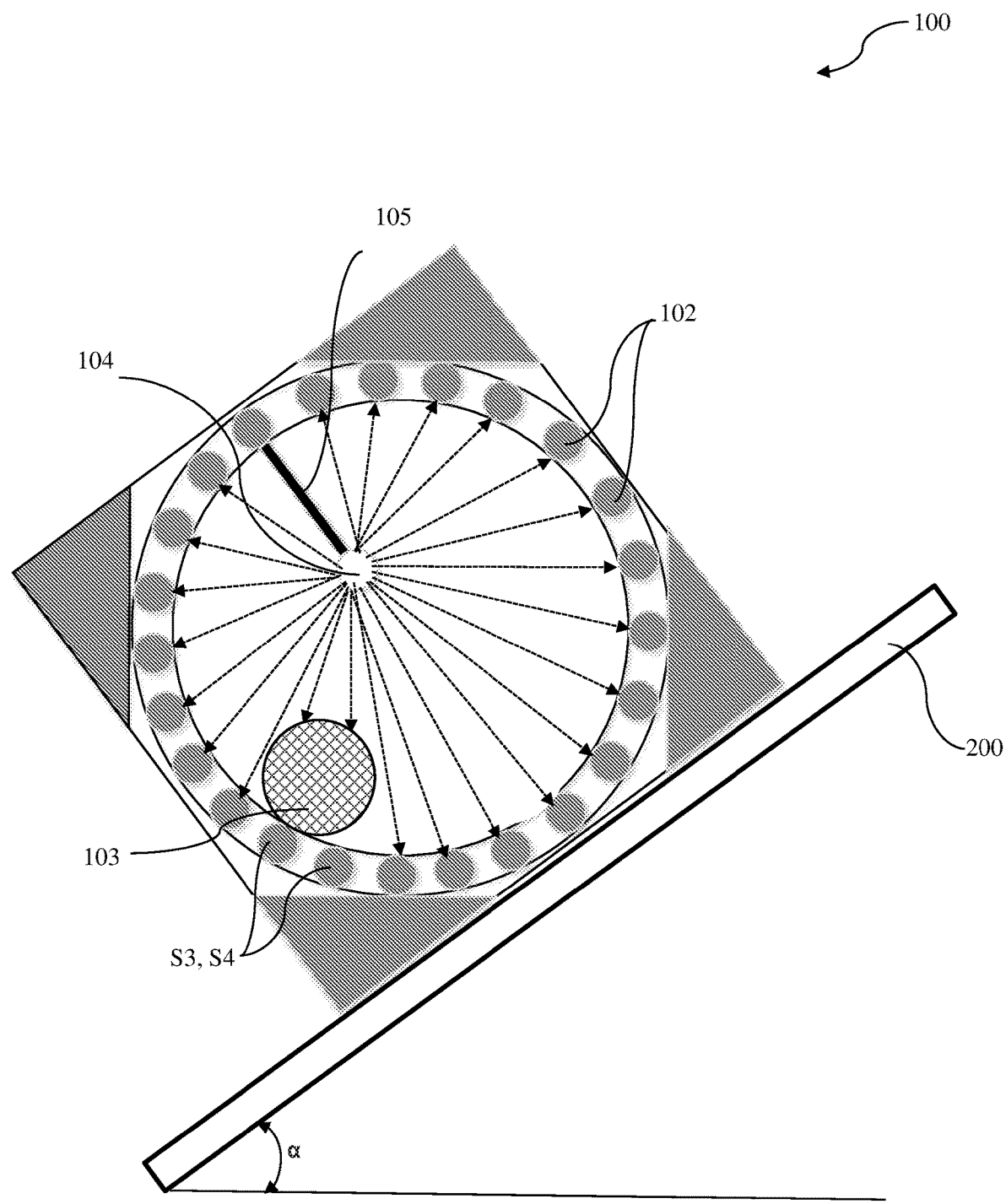
FIG. 3 illustrates the Ball Based Orientation Indication Device (BBOID) of FIG. 1, positioned on the object, which is oriented at an angle α with respect to horizontal, in accordance to an embodiment of the present disclosure.

Now referring to FIG. 3, which illustrates the device (100) positioned on the object. In an illustrative embodiment, the object is oriented at a certain angle α with respect to horizontal. Upon orientation of the object, the solid sphere (103) may displace or roll, within the hollow spherical member (101), pointing towards gravity, based on the orientation of the hollow spherical member (101) (thus, the object). Due to effect of gravity, the solid sphere (103) may occupy the lowermost position of the hollow spherical member (101) and may cover one or more sensors of the plurality of sensors (102). As an example, the solid sphere (103) may cover the one or more sensors S3 and S4 at the lowermost position of the hollow spherical member (101), and thus blocks the impingement of light onto the one or more sensors S3 and S4. The sensors S3 and S4, which are blocked from the impingement of light may activate or deactivate based in the configuration. The activated or deactivated sensors S3 and S4 may generate a signal. The signal from sensors S3 and S4 may be received by the computing unit (107). Based on the signal from the one or more sensors S3 and S4, the computing unit (107) may indicate the orientation of the object at that point of time, in mutually perpendicular axes, i.e. in pitch, roll and yaw axes. The computing unit (107) indicates the orientation of the object in one of an analog form and a digital form.

In an embodiment, the device (100) facilitates in indicating orientation of the object in mutually perpendicular axes, i.e. pitch, roll and yaw axes for any displacement or orientation of the object at that instant of time. Moreover, the solid sphere (103) displaces over one or more of the plurality of sensors (102) based on the movement of the object, i.e. the object may displace or orient in one or more axes and the solid sphere (103) displace accordingly in order to determine the orientation of the object in these one or more axes.

In an embodiment, the lowermost position of the hollow spherical member (101) may change continuously based on orientation of the object. Thus, the solid sphere (103), blocks the one or more sensors in the lowermost position of the hollow spherical member (101) at that instant of time, and thus facilitates in determining orientation of object.

In an embodiment, the Ball Based Orientation Indication device (100) (BBOID) facilitates in determining orientation of the object about three mutually perpendicular axes i.e. Pitch, Roll and Yaw axes in that position.

In an embodiment, the object may be at least one of automobiles, aircrafts, ships and the like.

In an embodiment, the plurality of sensors (102) are at least one of light sensors, photoelectric sensors, proximity sensors, photovoltaic sensors or any other sensor that serves the purpose.

In an embodiment, the computing unit (107) may include an I/O interface, a memory a processor [not shown in Figures]. The I/O interface may be adapted to receive input data from the plurality of sensors (102). The data received by the I/O interface may be stored in the memory, which may be utilized by the processor for determining the orientation of the object.

The memory may also include computing instructions for determining the orientation of the object.

In an embodiment, the solid sphere (103) blocking impinging light on to the sensors S1 and S2, at idle position of the object and blocking the impinging light on to the sensors S3 and S4, at oriented position of the object, is for the purpose of illustration only, and the same may not be considered as a limitation.

In an embodiment, the light source (104) may be at least a laser beam, candescent light source, and an incandescent light source, which may impinge light onto each of the plurality of sensors (102).

In an embodiment, the Ball Based Orientation Indication device (100), is simple in construction.

In an embodiment, due to simple construction, the Ball based Orientation Indication device (100) is economical for manufacture.

In an embodiment of the present disclosure, the orientation determination of a particular object can be determined by the Ball Based Orientation Indication device (100) provisioned with at least one or combination of the following but not limiting to analog markings, use of sensors or any other similar orientation measuring techniques which are known in the art.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| REFERRAL NUMERALS | |
|---|---|
| Description | Referral Numeral |
| Ball Based Orientation Indication device | 100 |
| Spherical member | 101 |
| Plurality of sensors | 102 |
| Solid sphere | 103 |
| Light source | 104 |
| Rod member | 105 |
| Housing | 106 |
| Computing unit | 107 |
| Indication unit | 108 |
| Cavity | 109 |
| Inner surface of hollow spherical member | 110 |
| Outer surface of hollow spherical member | 111 |

The invention claimed is:

1. A device (100) for determining orientation of an object, the device (100) comprising:
   a hollow spherical member (101);
   a plurality of sensors (102) positioned at predetermined locations in the hollow spherical member (101);
   a light source (104), suspended from an uppermost point of an inner surface of the hollow spherical member (101), the light source (104) is configured to illuminate the hollow spherical member (101), and impinge light on to each of the plurality of sensors (102); and
   a solid sphere (103), provided within the hollow spherical member (101), wherein the solid sphere (103) is configured to displace within the hollow spherical member (101) pointing towards gravity, over one or more sensors of the plurality of sensors (102) to block impingement of light on corresponding one or more sensors, for determining orientation of the object.

2. The device (100) as claimed in claim 1, wherein the hollow spherical member (101) comprises an inner surface (110) and an outer surface (111) defining a cavity (109), and the plurality of sensors (102) are positioned within the cavity (109).

3. The device (100) as claimed in claim 1, wherein the light source (104) is suspended from the uppermost point of the inner surface (110) of the hollow spherical member (101), via one of a rod member (105), a holder member and a post member.

4. The device (100) as claimed in claim 1, wherein each of the plurality of sensors (102) is associated with a computing unit (107).

5. The device (100) as claimed in claim 1, wherein blocking impingement of light on one or more sensors, activate or deactivate the corresponding one or more sensors, to generate an input signal.

6. The device (100) as claimed in claim 5, wherein the input signal from the blocked one or more sensor of the plurality of sensors (102) is received by the computing unit (107), to determine orientation of the object.

7. The device (100) as claimed in claim 6, wherein the computing unit (107) indicates the orientation of the object in at least one of analog form and digital form.

8. The device (100) as claimed in claim 1, wherein the device (100) is configured to determine the orientation of the object in pitch, roll and yaw axes.

9. The device (100) as claimed in claim 1, wherein the inner surface (110) of the hollow spherical member (101) is manufactured of a transparent material to allow impingement of light on to each of the plurality of sensors (102).

10. The device (100) as claimed in claim 1, wherein the solid sphere (103) is manufactured of an opaque material to block impingement of light on to the one or more sensors of the plurality of sensors (102).

* * * * *